United States Patent
Kondou et al.

(10) Patent No.: US 7,430,940 B2
(45) Date of Patent: Oct. 7, 2008

(54) SHIFT LEVER DEVICE

(75) Inventors: Yoshinobu Kondou, Kosai (JP); Kyoichi Inoue, Kosai (JP); Ei Inaba, Yokohama (JP); Naoki Norimatsu, Isehara (JP)

(73) Assignee: Nissan Motor Company, Ltd, Yokohama Shi, Kanagama Ken (JP)

( * ) Notice: Subject to any disclaimer, the term of this patent is extended or adjusted under 35 U.S.C. 154(b) by 841 days.

(21) Appl. No.: 10/864,871

(22) Filed: Jun. 10, 2004

(65) Prior Publication Data

US 2005/0011293 A1 Jan. 20, 2005

(30) Foreign Application Priority Data

Jun. 11, 2003 (JP) ............................ P2003-165899

(51) Int. Cl.
*F16H 59/10* (2006.01)
(52) U.S. Cl. ...................... 74/537; 74/473.28; 74/473.3
(58) Field of Classification Search .............. 74/473.21, 74/473.28, 473.3, 523, 527, 537
See application file for complete search history.

(56) References Cited

U.S. PATENT DOCUMENTS 5,617,760 A    4/1997  Woeste et al.
6,601,469 B1   8/2003  Giefer et al.

FOREIGN PATENT DOCUMENTS

| DE | 44 34 135 A1 | 3/1996 |
|---|---|---|
| DE | 100 41 926 A1 | 5/2001 |
| JP | 7-259973 | 10/1995 |
| JP | 11-245680 | 9/1999 |
| JP | 2002-002321 | 1/2002 |
| JP | 2002-362177 | 12/2002 |

OTHER PUBLICATIONS

Japanese Office Action (with English Translation) issued in Japanese Patent Application No. JP 2003-165899 dated Jun. 12, 20007.

*Primary Examiner*—William C Joyce
(74) *Attorney, Agent, or Firm*—McDermott Will & Emery

(57) ABSTRACT

A shift lever device which includes: a shift lever turnably fitted on a stationary member; an engaging member for engagement of the shift lever with the stationary member; and a knob fitted on the shift lever. The engaging member is moved toward its distal end to disengage from the stationary member. The knob includes a knob body provided with a fitting hole into which the shift lever is inserted together with a first engaging part of the engaging member, a button pivoted on the knob body, and a link lever connected to the button, having a second engaging part for engagement with the first engaging part. When the shift lever is inserted into the fitting hole and the distal end thereof reaches a predetermined position therein, the button is operated to have the second engaging part engaged with the first engaging part.

7 Claims, 16 Drawing Sheets

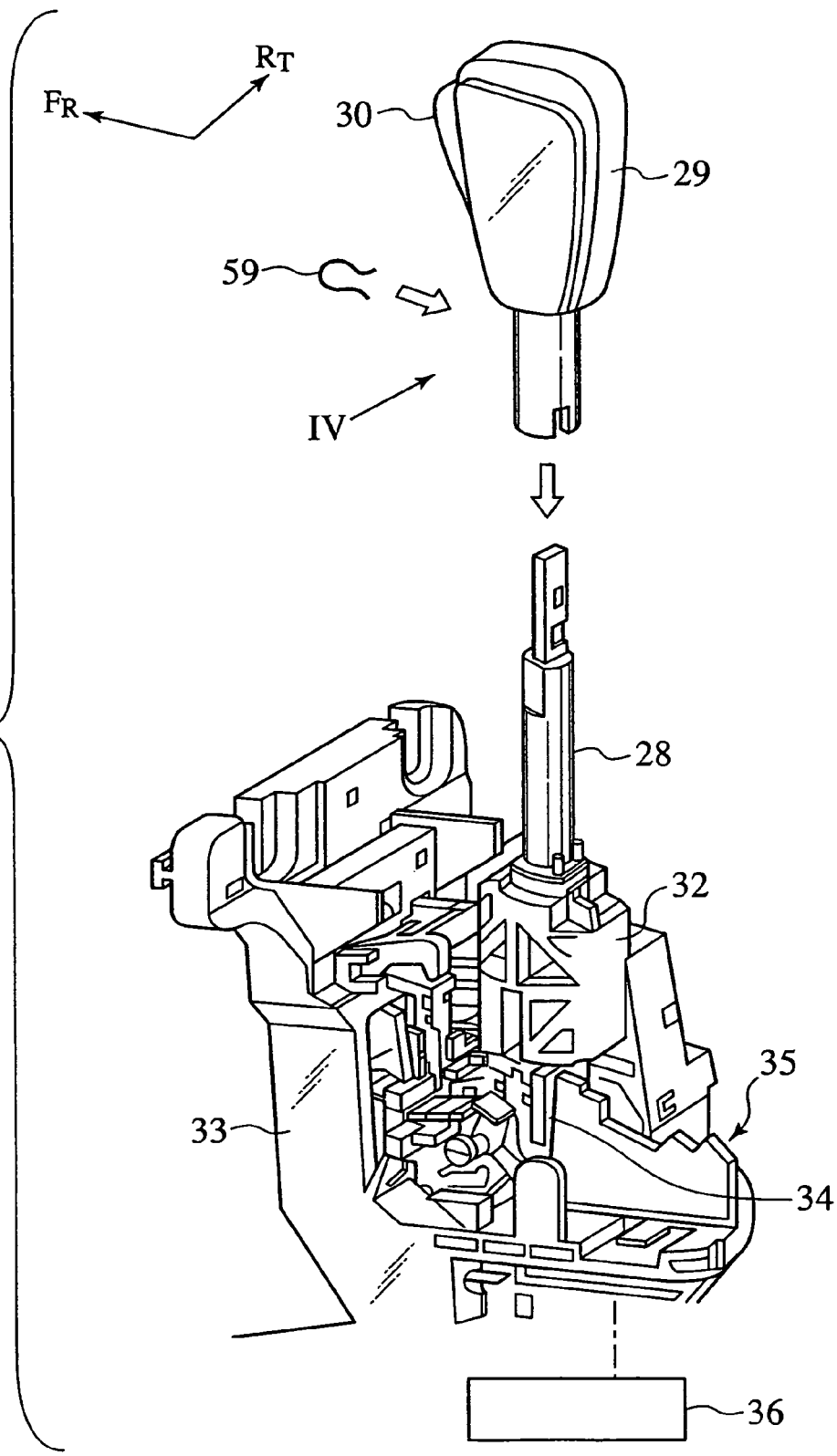

SHIFT LEVER DEVICE

BACKGROUND OF THE INVENTION

1. Field of the Invention

The present invention relates to a shift lever device in which a shift knob is fitted to a top of a shift lever.

2. Description of Related Art

Among various types of shift lever devices, there are so-called pull-up-type shift lever devices in which an inner compression rod is pulled up by pushing a button on a shift knob and the rod is thereby disengaged from a detent plate.

Some of shift lever devices of this type include a shift knob serving as a part which is detachable from a shift lever. Those shift lever devices are assembled by fitting a shift knob to a shift lever, for example, in a process after the shift lever has been installed into an indicator panel of a vehicle.

FIGS. 17 to 20 show such a shift lever device including a shift lever 1 and a shift knob 2 fitted thereto.

An axially movable compression rod 7 is biased downward and housed in the shift lever 1. A block 9 connected to the compression rod 7 is located above the shift lever 1. A lower slope 12 and an upper slope 13 are formed on an upper end 10 of the block 9.

A T-shaped sleeve 3 having a horizontal portion 4 and a vertical portion 5 is provided inside the shift knob 2. A spring 16 and a shift button 15 biased by the spring 16 are inserted into the horizontal portion 4. The shift button 15 has a lower slope 17 and an upper slope 18.

The upper end 10 of the block 9 is inserted between the lower slope 17 and the upper slope 18 of the shift button 15. Accordingly, the slope 17 contacts the slope 12 and the slope 18 contacts the slope 13.

SUMMARY OF THE INVENTION

When assembling the above-described shift lever device, as shown in FIG. 18, it is necessary to insert the shift button 15 and the spring 16 of the shift knob 2 into the horizontal portion 4 of the sleeve 3 to begin with.

Then, the shift knob 2 must be fitted to the shift lever 1 while pushing the shift button 15 into a proper position. If an amount of pushing the shift button 15 is insufficient, as shown in FIG. 19, the upper end 10 of the block 9 may damage the spring 16. On the contrary, if the shift button 15 is pushed excessively, the shift button 15 may block the upper end 10 of the block 9 being inserted between the lower slope 17 and the upper slope 18 thereof.

As described above, it is difficult and time-consuming to fit the shift knob 2 to the shift lever 1 while maintaining the shift button 15 in a proper position against force of the spring 16, thus reducing working efficiency for assembling the shift lever device.

In a manufacturing line, an operation for fitting a shift knob to a shift lever is often performed by a non-expert. Therefore, facilitation of such operation has been desired.

The present invention was made in the light of this problem. An object of the present invention is to provide a shift lever device which facilitates fitting of a shift knob to a shift lever.

An aspect of the present invention is a shift lever device comprising: a stationary member fixed to a vehicle body; a shift lever turnably fitted at a base end thereof to the stationary member; an engaging member provided through the shift lever, which is movable relative to the shift lever, toward the base end of the shift lever to engage with the stationary member and toward a distal end of the shift lever to disengage from the stationary member, the engaging member having a first engaging part on the side of the distal end of the shift lever; and a knob to be fitted on the distal end of the shift lever, the knob comprising a knob body provided with a fitting hole into which the distal end of the shift lever is inserted together with the first engaging part of the engaging member, a button pivoted on the knob body, to be operated for moving the engaging member, and a link lever connected to the button, having a second engaging part to be engaged with the first engaging part of the engaging member, the link lever movable between a first position where the second engaging part is out of the fitting hole and a second position where the second engaging part crosses the fitting hole, as the button is operated, wherein the distal end of the shift lever is inserted into the fitting hole as the link lever is in the first position, and, with the distal end of the shift lever at a predetermined position in the fitting hole, the button is operated to move the link lever from the first position to the second position and to have the second engaging part engaged with the first engaging part.

BRIEF DESCRIPTION OF THE DRAWINGS

The invention will now be described with reference to the accompanying drawings wherein:

FIG. 3 is an overall perspective view of the shift lever device.

DETAILED DESCRIPTION OF THE PREFERRED EMBODIMENT

Figure 1:
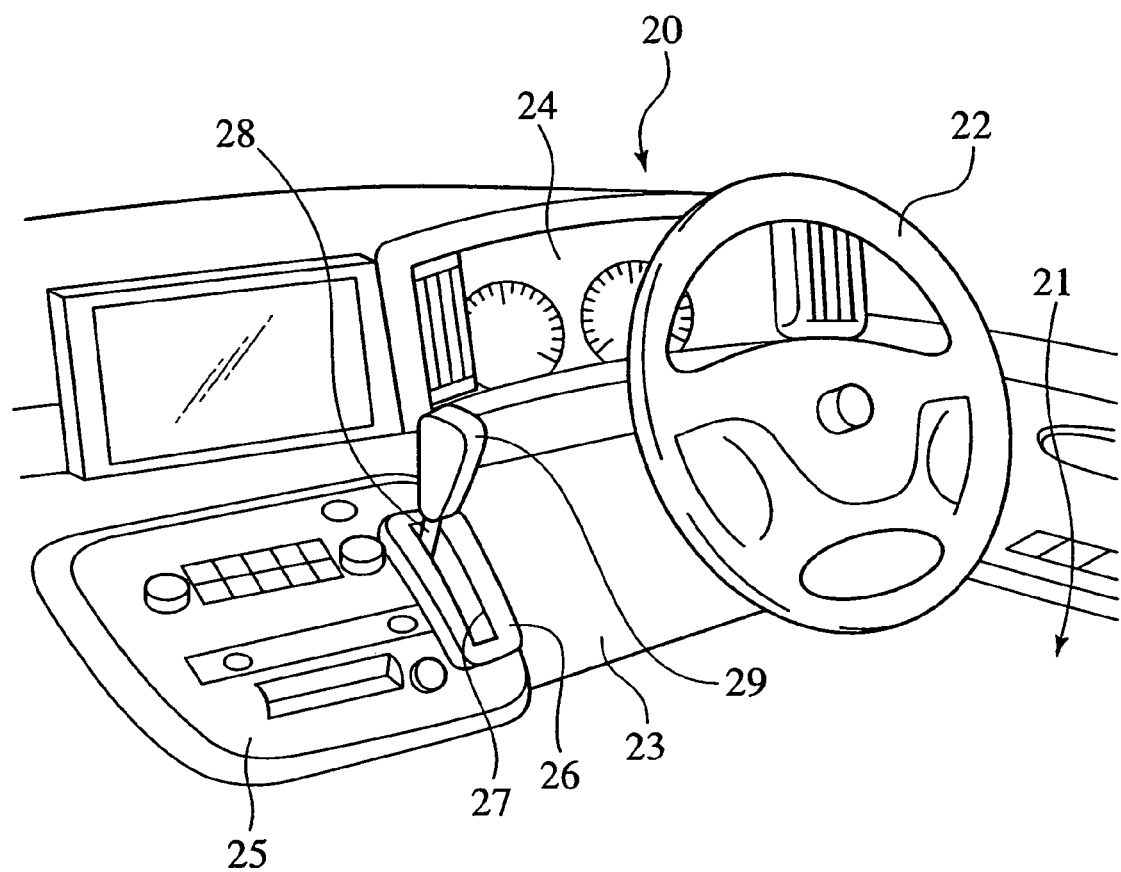
FIG. 1 is a perspective view showing a driver's seat of a vehicle adopting a shift lever device according to a first embodiment of the present invention.

Embodiments of the present invention will be explained below with reference to the drawings, wherein like members are designated by like reference characters.

First Embodiment

As shown in FIG. 1, there are provided a steering wheel 22, a meter panel 24 provided on an instrument panel 23, an AT finisher 25 and the like around a driver's seat 21 of a vehicle 20.

The AT finisher 25 is provided with a shift lever 28 which is turnable in an anteroposterior direction of the vehicle 20 along a guide hole 27 of a cover 26. A shift knob 29 is fitted to an upper part of the shift lever 28.

Figure 2A:
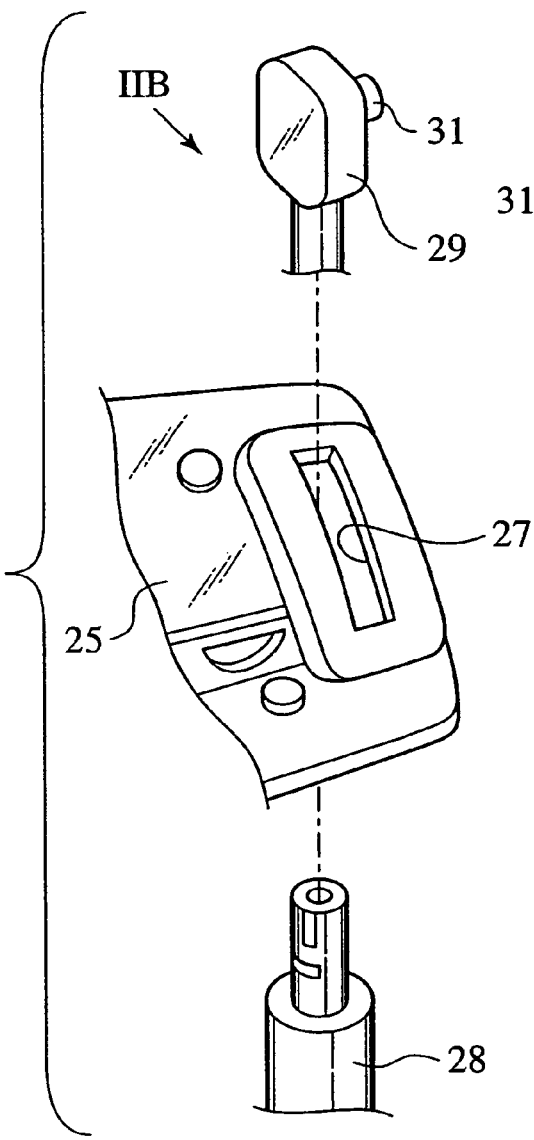
FIG. 2A is an exploded perspective view showing a shift lever, an AT finisher, and a shift knob.

To install the shift lever 28 in the vehicle 20, as shown in FIG. 2A, the shift lever 28 is firstly fitted to the vehicle 20 and then the AT finisher 25 and the shift knob 29 are fitted sequentially.

Figure 2B:
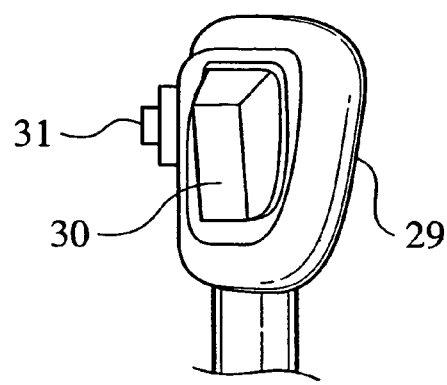
FIG. 2B is a view in the direction of arrow IIB in FIG. 2A.

On a front face of the shift knob 29, as shown in FIG. 2B, there is provided a shift button 30 which is operated for changing positions of the shift lever 28. In addition, this shift knob 29 is provided with an overdrive switch (O/Dsw) 31.

As shown in FIG. 3, a base portion 32 of the shift lever 28 is fitted to a support member 33, which is part of the vehicle body, so as to be turnable in the anteroposterior direction of the vehicle 20.

Below the base portion 32 of this shift lever 28, there is provided a detent 34 for positioning and fixing the shift lever 28. The detent 34 performs fixation and release of a position of the shift lever 28 by being engaged with and disengaged from a detent plate 35 which serves as a positioning means provided on the support member 33. A transmission 36 is operated to change gears in response to a gear position of the shift lever 28.

After the shift lever 28 is fitted to the support member 33, the shift knob 29 is fitted to an upper part of the shift lever 28. The upper part of the shift lever 28 and the shift knob 29 will be described in detail in FIG. 8.

Figure 8:
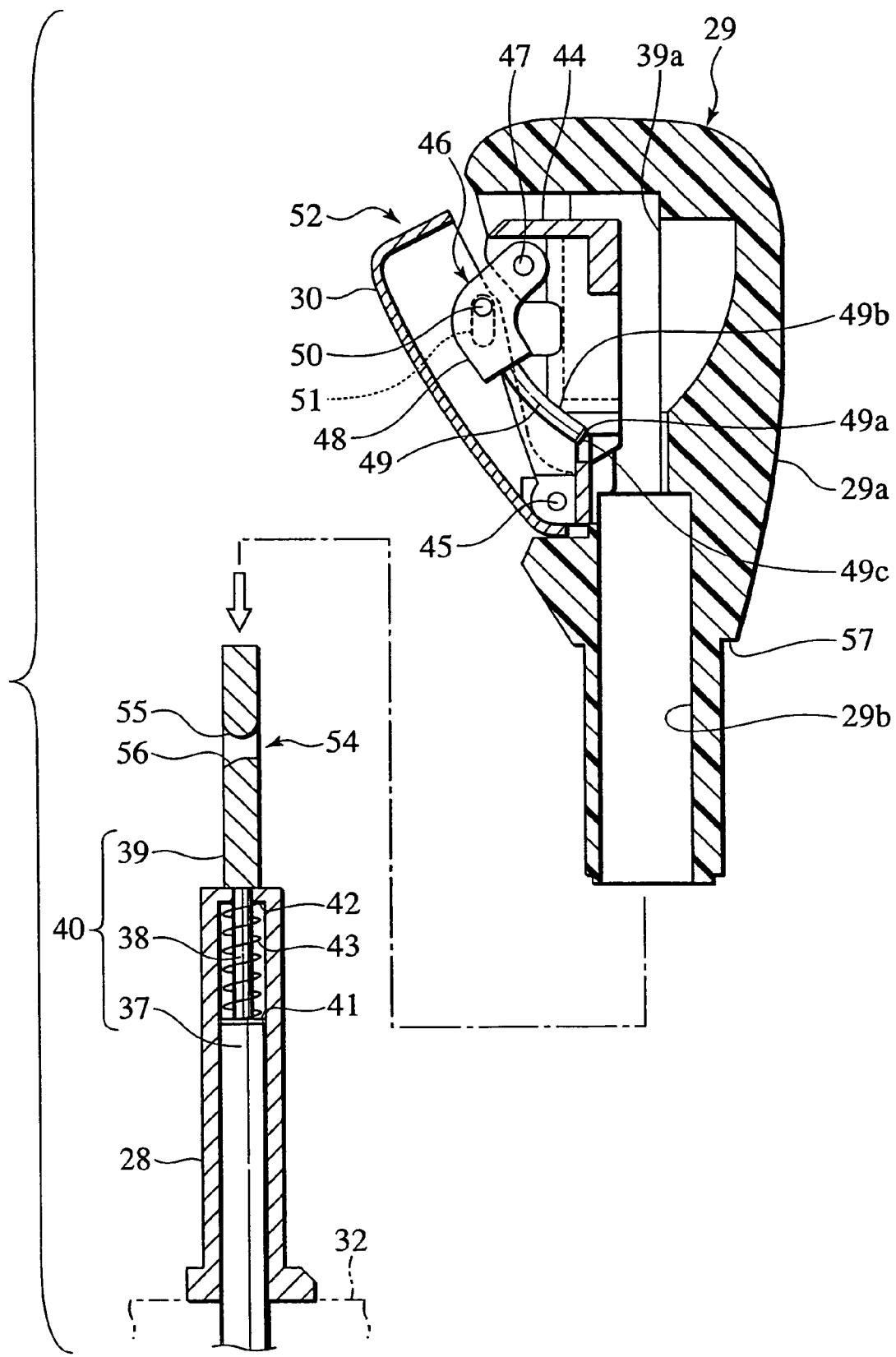
FIG. 8 is a longitudinal sectional view of the shift lever and the shift knob before fitting.

In FIG. 8, a compression rod 37 is housed so as to be movable in an axial direction inside the tubular shift lever 28. An upper end 41 of the compression rod 37 is connected to a pull block 39 provided on the upper part of the shift lever 28 through a connection rod 38 which penetrates an upper end plate 42 of the shift lever 28.

The compression rod 37, the connection rod 38 and the pull block 39 are integrated into an engaging member 40. The above-described detent 34 (FIG. 3) is provided at a lower end of the compression rod 37.

A compression spring 43 wound around the connection rod 38 is interposed between the upper end 41 of the compression rod 37 inside the shift lever 28 and the upper end plate 42 of the shift lever 28. The engaging member 40 is biased downward (in a direction in which the detent 34 is engaged with the detent plate 35) by resilience of this compression spring 43.

A knob body 29a of the shift knob 29 has a fitting hole 29b to allow an upper end of the shift lever 28 to be inserted and fitted thereto. A housing 44 of the shift button 30 is buried in the shift knob 29. At a lower end of the housing 44, one end (a lower end in this embodiment) of the shift button 30 is pivotally supported by a spindle 45. The shift button 30 is turnable in an anteroposterior direction around the spindle 45. On an upper part of the housing 44, an upper end of an L-shaped link lever 46 is pivotally supported by a spindle 47. The link lever 46 is also turnable in an anteroposterior direction around the spindle 47.

The link lever 46 is an integration of a flat plate portion 48 and an arcuate engaging portion 49, and has a convexly-curved shape projecting toward the spindle 45 (projecting almost obliquely downward to the left in the drawing).

A chamfer 49a is formed on a tip of the above-described arcuate engaging portion 49 of the link lever 46. It is possible to form a round portion or a semispherical tip instead of the chamfer 49a.

A pin 50 extending in parallel to the spindles 45 and 47 is fixed to the flat plate portion 48 at a bent portion of the link lever 46. The pin 50 is engaged with a long hole 51 which is formed on the shift button 30 and extends approximately in a vertical direction. The shift button 30 and the link lever 46 constitute a link mechanism 52.

When the shift button 30 is pushed toward a travel path 39a for the pull block 39 which is located in the center of the shift knob 29 and is thereby turned clockwise in the drawing, the link lever 46 is turned in the same direction (counterclockwise in the drawing) in conjunction with the shift button 30 by way of the engagement of the pin 50 with the long hole 51. In addition, the shift button 30 is biased to be turned outward from the shift knob 29 by resilience of an unillustrated torsion spring which is provided either on the spindle 45 or on the spindle 47.

An engaging hole 54 for allowing insertion and engagement of the arcuate engaging portion 49 of the link lever 46 is formed on the pull block 39 of the engaging member 40.

A roundly shaped portion 55 projecting convexly downward at a cross section in the axial direction is formed on an inner surface on an upper side of the engaging hole 54. The roundly shaped portion 55 functions as a guide when the arcuate engaging portion 49 is inserted and, also, as a contact surface for allowing an upper surface 49b of the engaged arcuate engaging portion 49 to contact and slide thereon.

A slope 56 which faces the link lever 46 is formed on a link lever 46 side of a lower inner surface of the engaging hole 54. The slope 56 also functions as a guide when the arcuate engaging portion 49 is inserted.

To engage the arcuate engaging portion 49 of the link lever 46 with the pull block 39 when fitting the shift knob 29 to the shift lever 28, it is necessary to push the shift button 30 at a point when a tip 49c of the arcuate engaging portion 49 of the link lever 46 reaches a position in which the tip 46 faces the engaging hole 54 of the pull block 39 in the course of pushing the shift lever 28 into the shift knob 29.

An operation of pushing the shift button 30 will be described based on FIG. 4 and FIG. 7.

Figure 4:
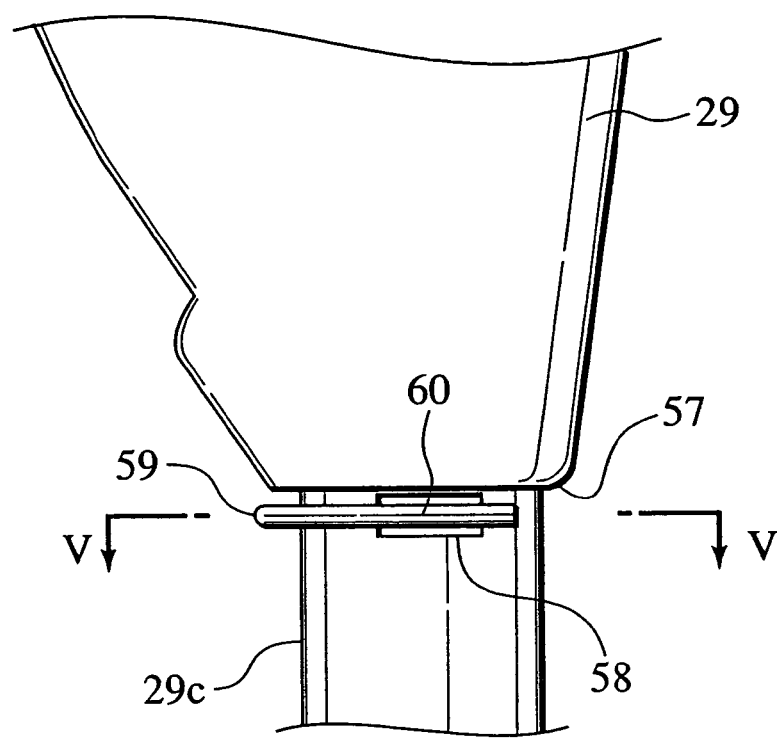
FIG. 4 is an enlarged view in the direction of arrow IV in FIG. 3, which shows a fixing pin attaching portion of the shift knob.
Figure 5:
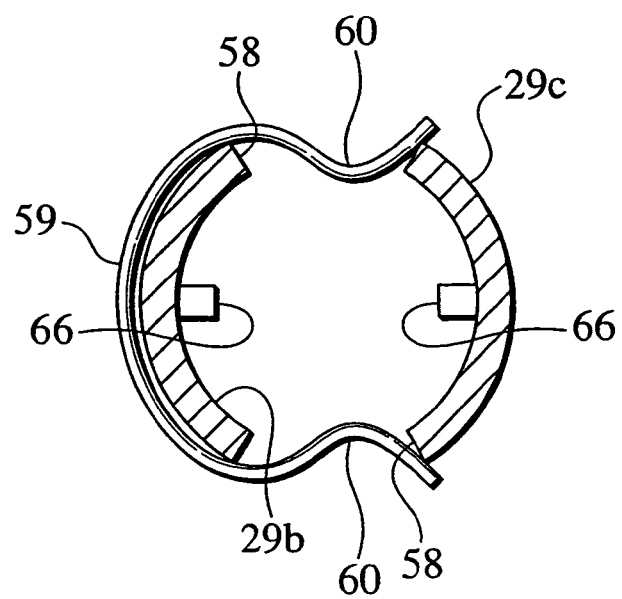
FIG. 5 is a cross-sectional view taken along the V-V line in FIG. 4.

As shown in FIG. 4, a tubular portion 29c is formed below a step difference portion 57 at a lower end of the shift knob 29. On an upper part of the tubular portion 29c close to the step difference portion 57, as shown in FIG. 5, a pair of stopper holes 58 extending almost perpendicularly to an axis of the tubular portion 29c are formed in mutually opposed positions. On an inner circumferential surface of the tubular portion 29c in the same positions as these stopper holes 58 in the axial direction, a pair of guide protrusions 66 protruding inward from the inner circumferential surface are provided in positions which are phase shifted by about 90 degrees relative to the stopper holes 58.

Figure 6:
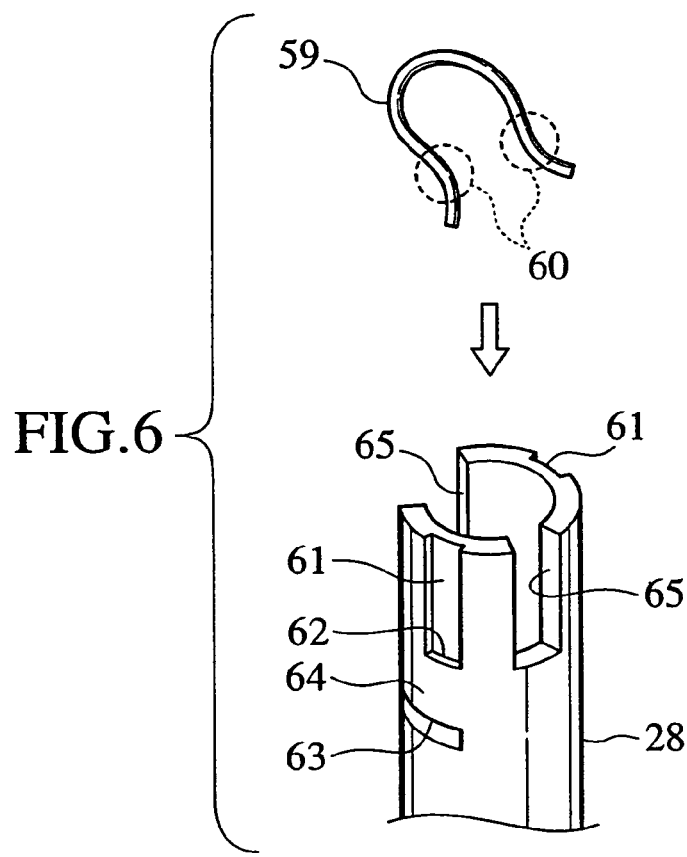
FIG. 6 is a perspective view showing the shift lever and a fixing pin.

As shown in FIG. 5 and FIG. 6, an approximately U-shaped fixing pin 59 is fitted into the stopper holes 58. Protrusions 60 are formed in mutually opposed positions in the vicinities of two free ends of the fixing pin 59 by means of bending so as to be convex inward. The protrusions 60 are respectively inserted into the stopper holes 58 of the tubular portion 29c, and protrude inward from the inner circumferential surface of the fitting hole 29b (see FIG. 5).

As shown in FIG. 6, a pair of guide grooves 61 are formed in mutually opposed positions on an outer circumferential portion of the upper end of the shift lever 28. Each of the guide grooves 61 extends approximately in parallel to the axis of the shift lever 28 so as to guide the protrusions 60 of the fixing pin 59 when fitting the shift knob 29 to the shift lever 28. An end wall 62 which is approximately perpendicular to the axis of the shift lever 28 is provided at a lower end of each of the guide grooves 61. A pair of fixing holes 63 extending almost perpendicularly to the axis of the shift lever 28 are formed in mutually opposed positions below the guide grooves 61 on the outer circumferential surface of the shift lever 28. That is to say, radial stepped portions 64 are formed between the end walls 62 of the guide grooves 61 and the fixing holes 63 on the outer circumferential surface of the shift lever 28.

Moreover, a pair of guide slits 65 are provided on the upper end of the shift lever 28 in positions which are phase shifted by about 90 degrees relative to the guide grooves 61. The guide slits 65 extend in the axial direction of the shift lever 28 so as to guide the guide protrusions 66 of the tubular portion 29c of the shift knob 29 when fitting the shift knob 29 to the shift lever 28.

When the upper end of the shift lever 28 is inserted into the fitting hole 29b of the shift knob 29 as described later, the protrusions 60 of the fixing pin 59 are guided by the guide grooves 61, and when the protrusions 60 reach the end walls 62 at the lower ends of the guide grooves 61, the protrusions 60 come into contact with the end walls 62. In this way, an operator who inserts the shift knob 29 can detect that the shift knob 29 has reached a predetermined position of the shift lever 28, and can increase force to insert the shift knob 29 at that point.

Accordingly, the protrusions 60 of the fixing pin 59 and the end walls 62 of the guide grooves 61 constitute a detection mechanism for detecting that the tip of the arcuate engaging portion 49 formed on the link lever 46 of the shift knob 29 has reached a position in which the tip can be engaged with the engaging hole 54 of the engaging member 40.

Descriptions will be provided regarding fitting of the shift knob 29 to the shift lever 28.

When the shift lever 28 is inserted into the shift knob 29, the guide protrusions 66 of the shift knob 29 are engaged with the guide slits 65 of the shift lever 28. In this way, the angular position of the shift knob 29 relative to the shift lever 28 is appropriately regulated.

Figure 7:
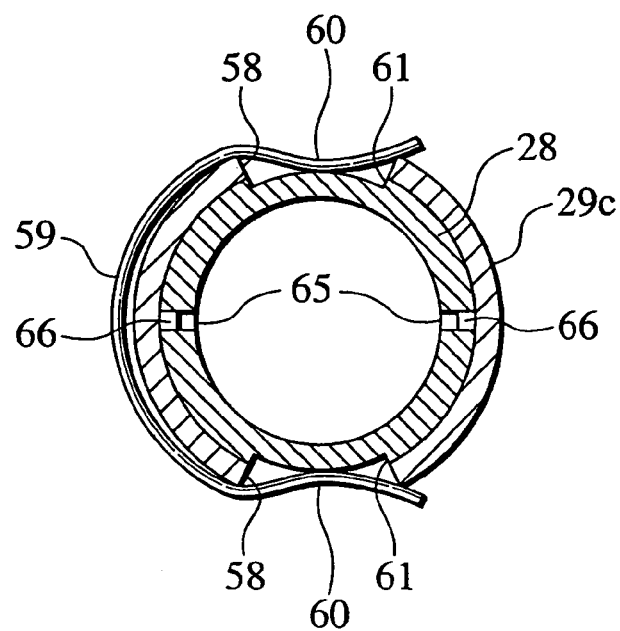
FIG. 7 is a cross-sectional view of the fixing pin attaching portion when the shift knob is fitted to the shift lever.

Subsequently, when pushing the shift knob 29 more deeply, the protrusions 60 of the fixing pin 59 fitted to the shift knob 29 go down while being guided by the guide grooves 61 of the shift lever 28, as shown in FIG. 7.

When the protrusions 60 of the fixing pin 59 come into contact with the end walls 62 of the guide grooves 61, it is detected that the shift knob 29 has reached the predetermined position at the upper end of the shift lever 29.

Figure 9:
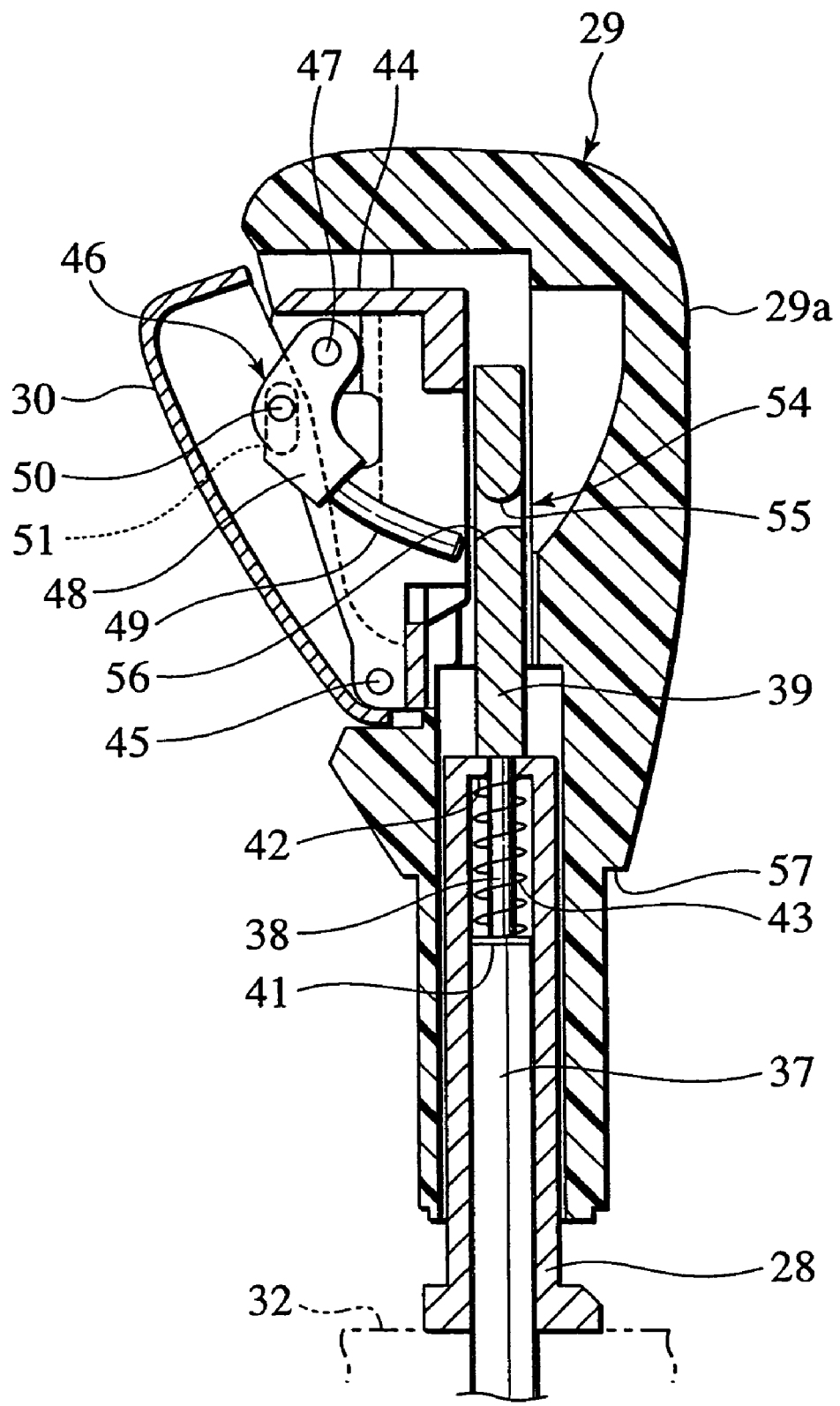
FIG. 9 is a view showing an operation of the device in FIG. 8.

In other words, it is detected that the arcuate engaging portion 49 of the link lever 46 can be engaged with the engaging hole 54 of the pull block 39 by pushing the shift button more deeply while increasing force applied to the shift knob 29 for insertion of the shift lever 28 at this point (see FIG. 9).

Therefore, the protrusions 60 of the fixing pin 59 and the end walls 62 of the guide grooves 61 function as a detection mechanism for notifying the operator of a position where it is possible to push the shift button 30.

Figure 10:
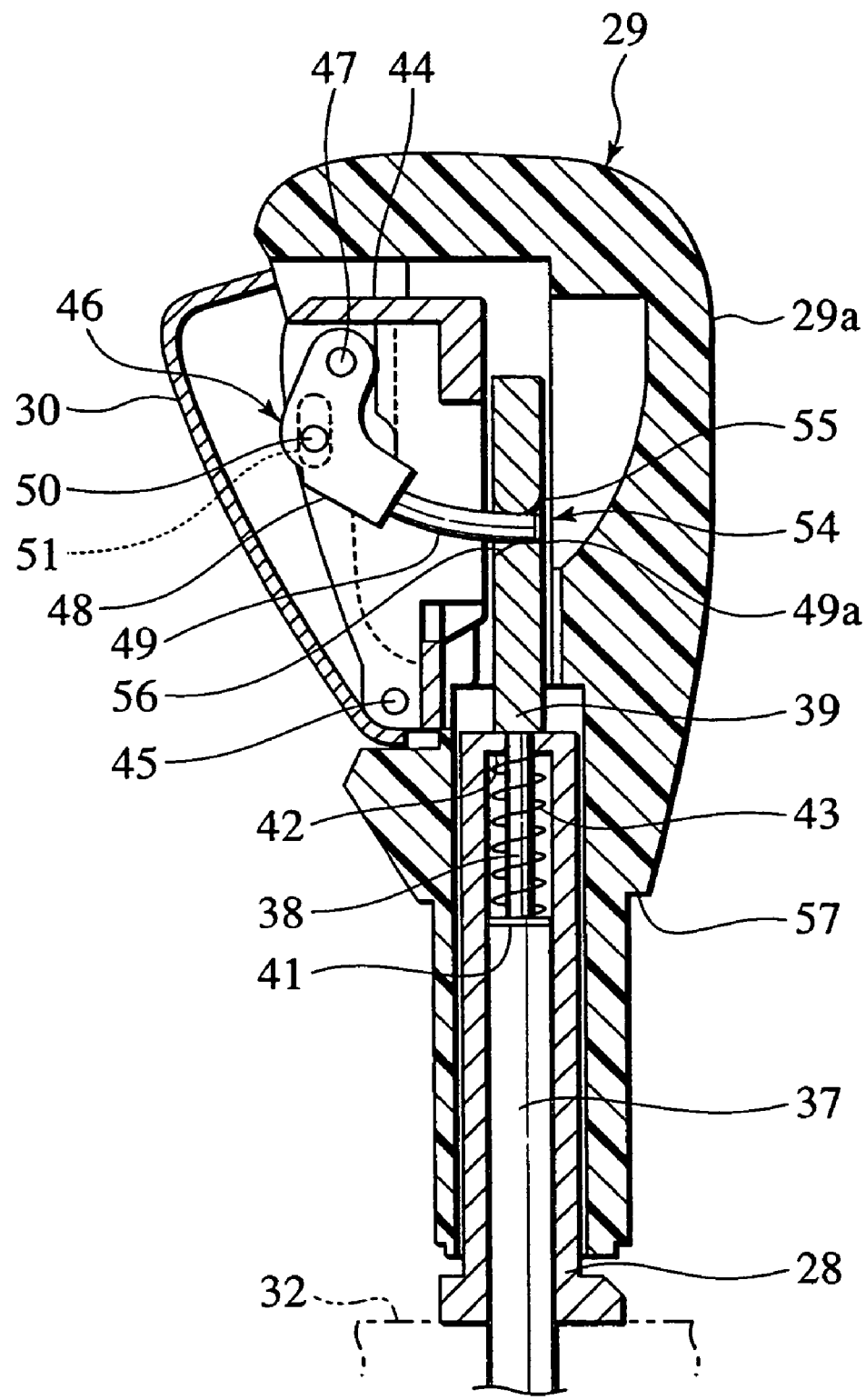
FIG. 10 is a view showing another operation of the device in FIG. 8.

Thereafter, by getting the shift lever 28 to insert into the shift knob 29 further while pushing the shift button 30, the arcuate engaging portion 49 of the link lever 46 is engaged with the engaging hole 54 of the pull block 39 and is thereby interlocked as shown in FIG. 10. After the link lever 46 is interlocked with the engaging hole 54, the pull block 39 is always located on a turning track of the arcuate engaging portion 49 of the link lever 46. Accordingly, the arcuate engaging portion 49 will never drop out of the pull block 39.

When the shift knob 29 is finally pushed from a position shown in FIG. 9 to another shown in FIG. 10, the protrusions 60 of the fixing pin 59 overpass the stepped portions 64 on the shift lever 28, and are engaged with the fixing holes 63 of the shift lever 28 (see FIG. 6).

To allow the protrusions 60 of the fixing pin 59 to overpass the stepped portions 64 of the shift lever 28, the U-shaped fixing pin 59 has to be elastically deformed to be open out. In this event, reactive force is applied to the pushed shift knob 29. Accordingly, the reactive force notifies the operator of proper timing for pushing the shift button 30 and provides the operator with a feeling on what an appropriate pushing force should be.

Figure 11:
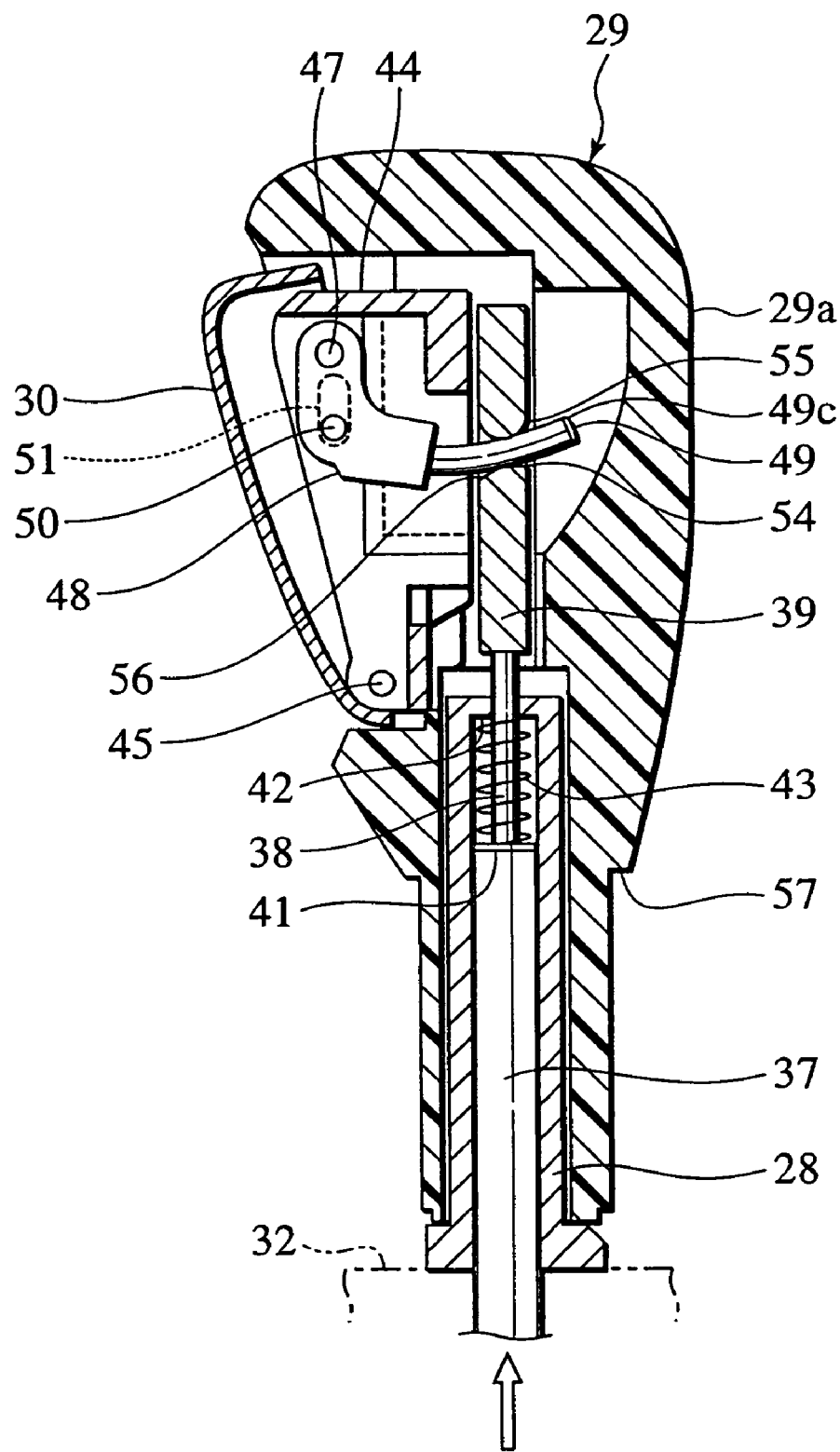
FIG. 11 is a view showing still another operation of the device in FIG. 8.

The shift button 30 is pushed further in order to set a gear position by shifting the shift lever 28 shown in FIG. 10. The link lever 46 is further turned counterclockwise in the drawing and thereby lifts up the pull block 39 and the compression rod 37 which is integrated with the bull block 39 (see FIG. 11).

As a result, the detent 34 (see FIG. 3) of the compression rod 37 is disengaged from the detent plate 35, whereby the shift lever 28 can be turned to a selected gear position.

The link lever 46 and the arcuate engaging portion 49 form an approximately arcuate shape which is concave relative to the spindle 47. Accordingly, when turning the link lever 46 by pushing the shift button 30 in order to pull up the pull block 39 and the compression rod 37, a turning range of the link lever 46 can be reduced, thus making the shift button 30 compact.

Moreover, a portion of the arcuate engaging portion 49 of the link lever 46 located inside the engaging hole 54 of the pull block 39 is inserted almost in parallel to the axial direction of the engaging hole 54 or almost perpendicularly to the pull block 39 at any time when turning the link lever 46. Accordingly, it is possible to reduce a gap between the link lever 46 and the pull block 39 when operating the shift button 30.

Moreover, it is possible to apply the pulling force of the link lever 46 consistently upward relative to the pull block 39 when turning the link lever 46 (stabilization of a loading direction). In this way, a load loss for pulling up the compression rod 37 is reduced and less force is required for operating the shift button 30.

In the meantime, since the roundly shaped portion 55 is formed on the upper inner surface of the engaging hole 54 of the pull block 39, it is easier to insert the arcuate engaging portion 49 of the link lever 46 into the predetermined position of the engaging hole 54.

Furthermore, since the slope 56 is provided on the lower inner surface of the engaging hole 54 of the pull block 39, it is easier to insert the arcuate engaging portion 49 of the link lever 46 into the predetermined position of the engaging hole 54. The slope 56 also functions as a guide for the arcuate engaging portion 49 when detaching the shift knob 29 from the shift lever 28.

Second Embodiment

Figure 12:
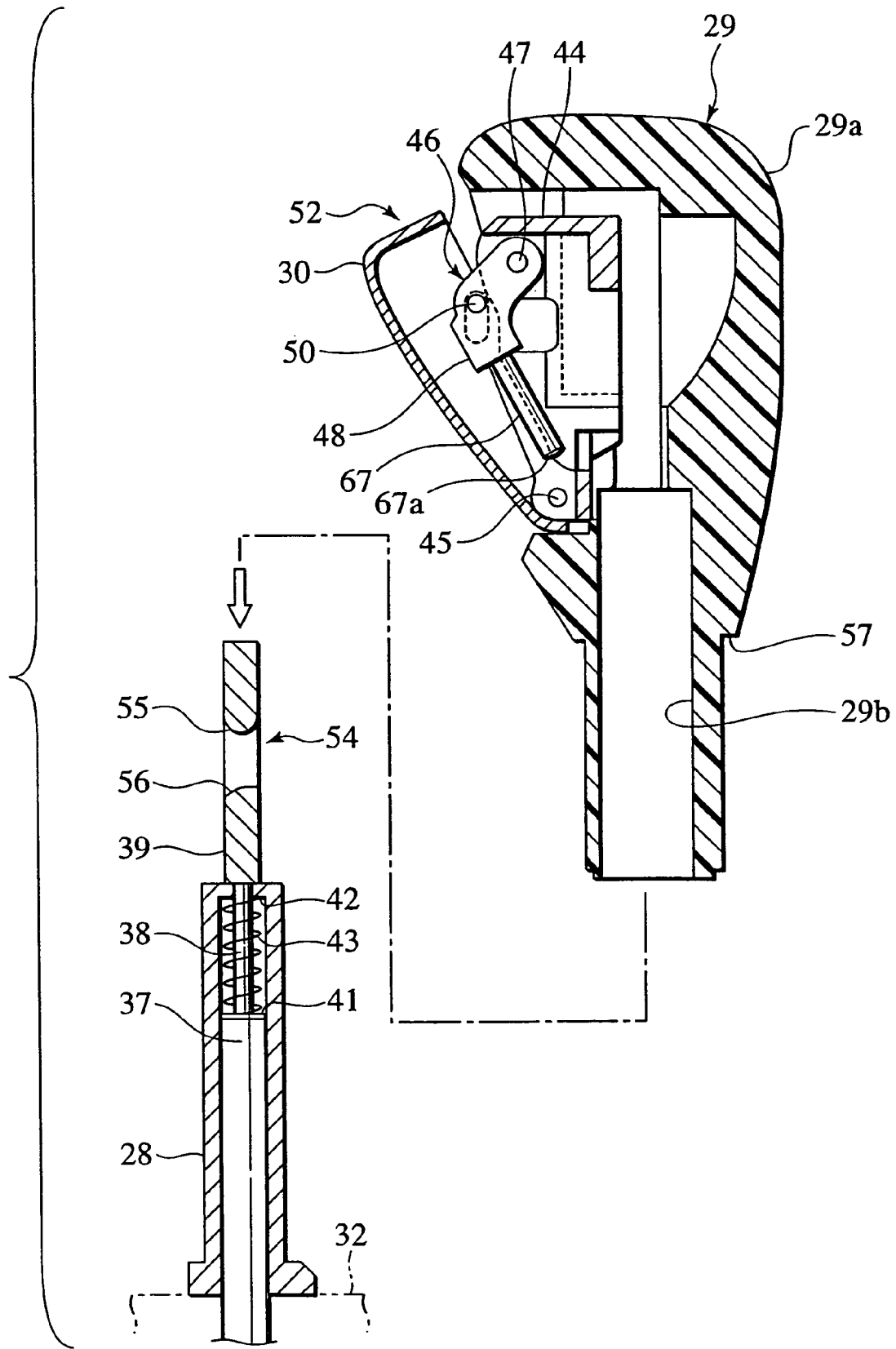
FIG. 12 is a longitudinal sectional view of a shift lever and a shift knob of a shift lever device according to a second embodiment of the present invention before fitting.
Figure 13:
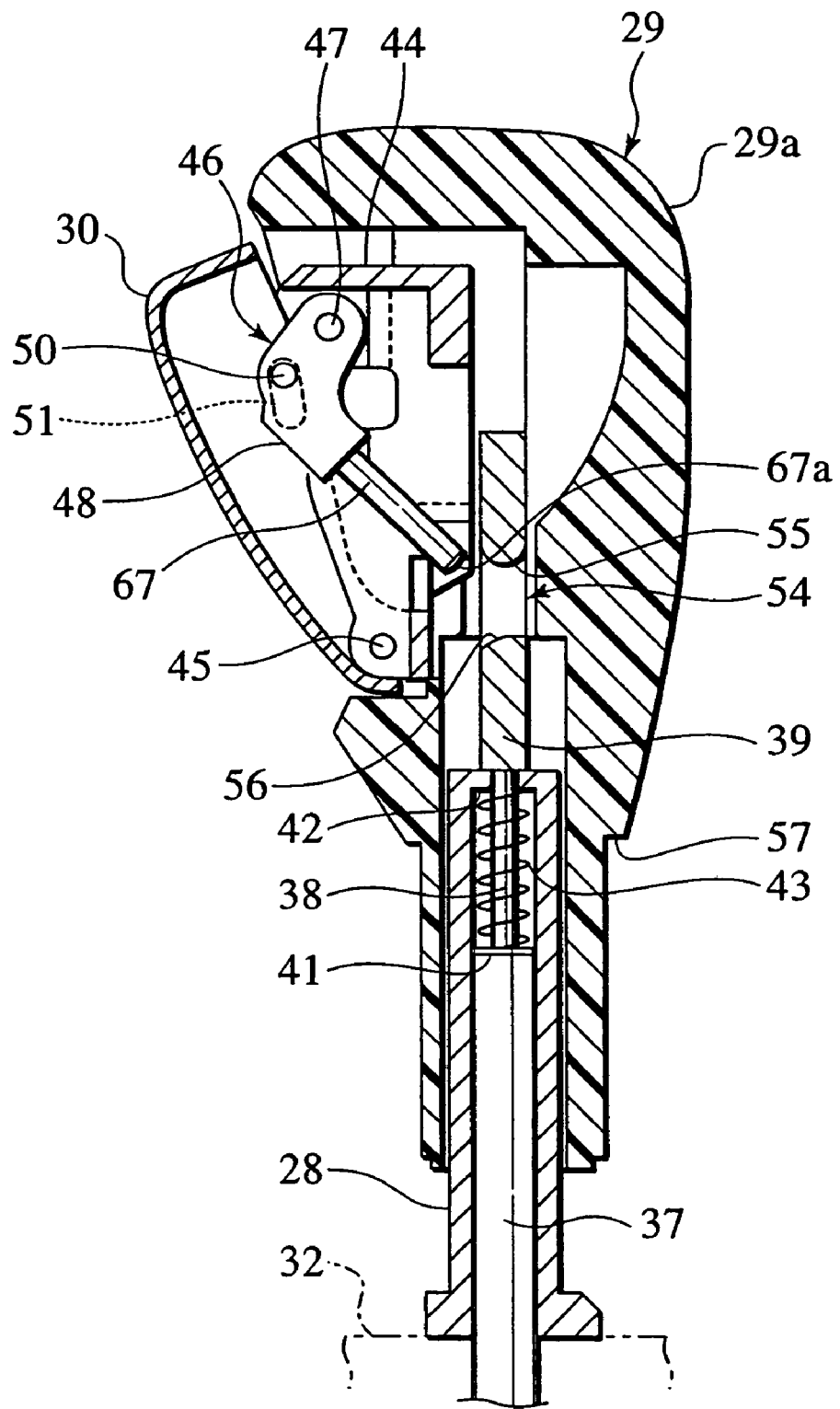
FIG. 13 is a view showing an operation of the device in FIG. 12.
Figure 14:
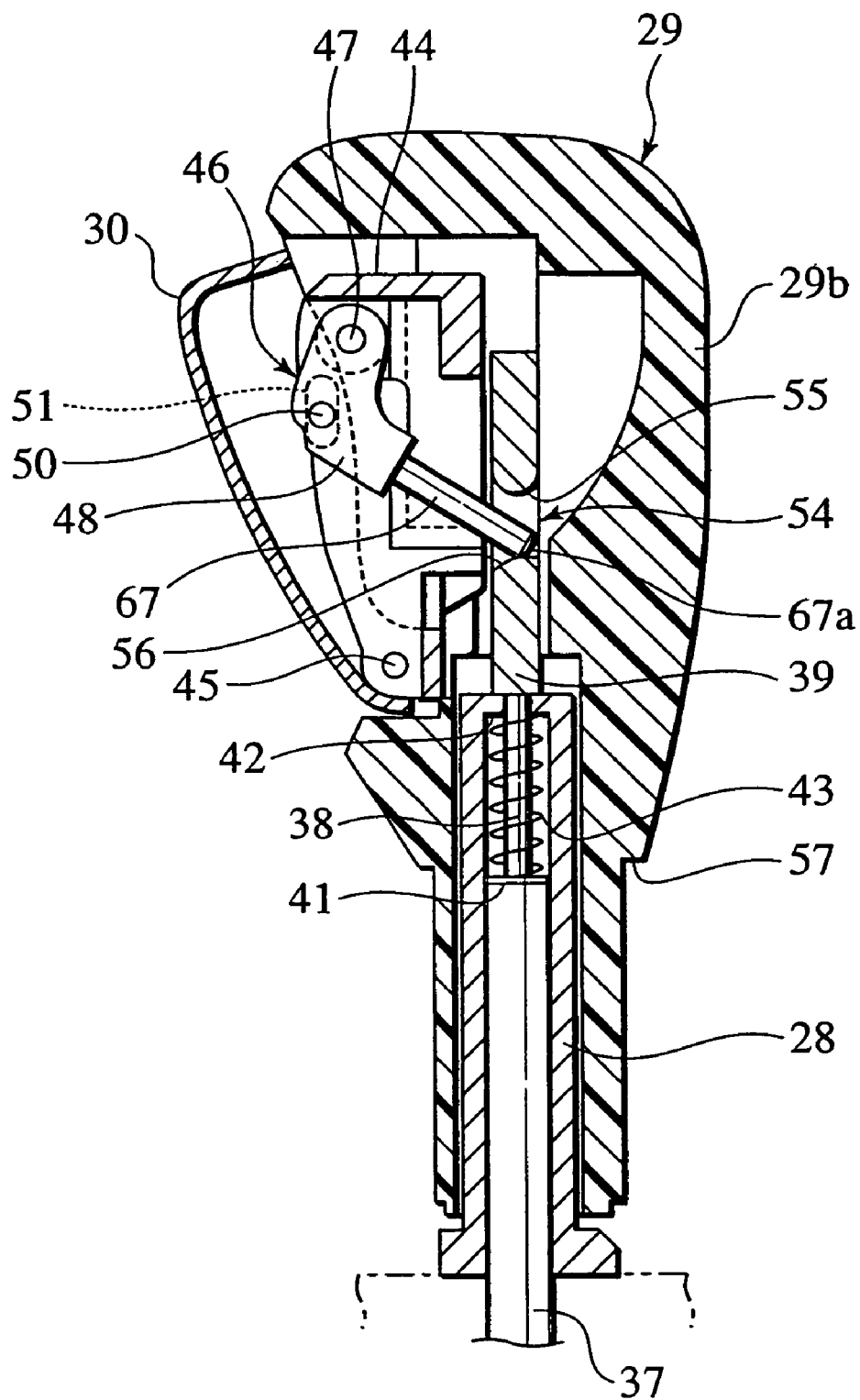
FIG. 14 is a view showing another operation of the device in FIG. 12.

FIGS. 12 to 14 show a structure of a shift lever according to the second embodiment of the present invention. The same components as those in the first embodiment will be designated by reference numerals and symbols thereof in the first embodiment, and descriptions thereof will be omitted.

In FIG. 12, the link lever 46 includes the flat plate portion 48 and a straight engaging portion 67 provided at an end of the flat plate portion 48. A chamfer (or a round portion) 67a is formed on a tip of the straight engaging portion 67.

The engaging hole 54 formed on the pull block 39 is slightly larger than the engaging hole 54 in the first embodiment. The rest of the components are the same as those shown in the first embodiment.

In the process of inserting the shift lever 28 into the shift knob 29 in order to fit the shift knob 29 in FIG. 12 to the shift lever 28, the protrusions 60 of the fixing pin 59 of the shift knob 29 come into contact with the end walls 62 at the lower ends of the guide grooves 61, as shown in the first embodiment. In this position, the straight engaging portion 67 of the link lever 46 becomes insertable into the engaging hole 54 of the pull block 39 as shown in FIG. 13.

By moving the shift knob 29 downward while pushing the shift button 30 shown in FIG. 13, the straight engaging portion 67 of the link lever 46 is inserted into and engaged with the engaging hole 54 of the pull block 39, as shown in FIG. 14.

Even if a free end of the link lever 46 is formed into a linear shape, it is possible to easily fit the shift knob 29 to the shift lever 28 in this embodiment as well as in the first embodiment.

The second embodiment is inferior to the first embodiment in terms of the following points: an increase in the turning range of the link lever 46 requires a larger space for location thereof and an increase in size of the shift knob 29; the larger engaging hole 54 causes a larger gap from a point to start pushing the shift button 30 to a point of application of the pulling force to the pull block 39, and such tendency is significant because the shift button 30 is biased counterclockwise in the drawing by an unillustrated spring; and the loading direction to the link lever 46 in the course of pulling up the pull block 39 is not stabilized but is deviated from the axial direction of the pull block 39, thus requiring more button operating force to be applied to the shift button 30. Nevertheless, the shift knob 29 in the second embodiment can be manufactured at lower costs than that in the first embodiment because of its simpler shape. In terms of the above-described points, it is preferable that the free end of the link lever 46 is formed into the arcuate engaging portion 49 as shown in the first embodiment.

Figure 15:
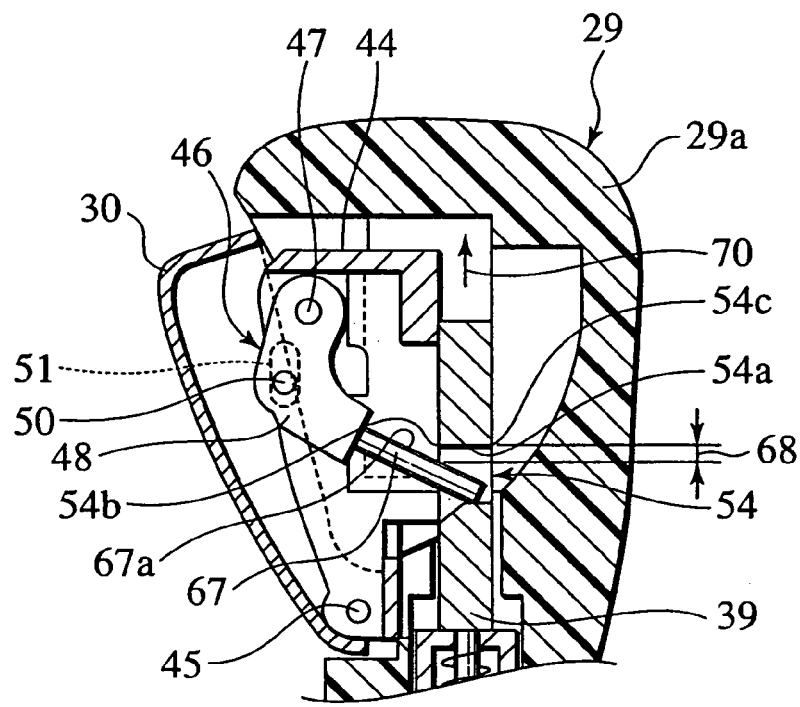
FIG. 15 is a longitudinal sectional view of the shift knob in a state of engagement of a button link having a straight engaging portion with an engaging hole having a flat upper end.
Figure 16:
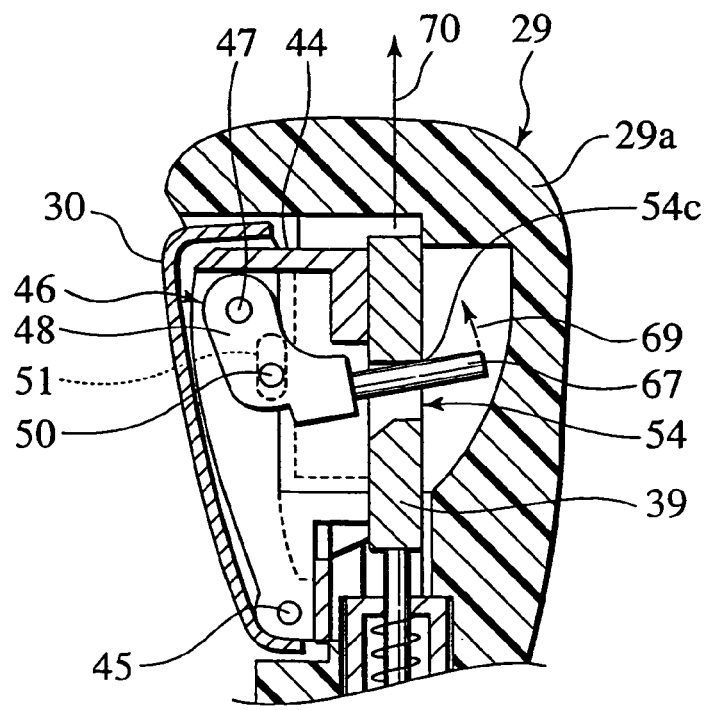
FIG. 16 is a view showing an operation of the device in FIG. 15.
Figure 17:
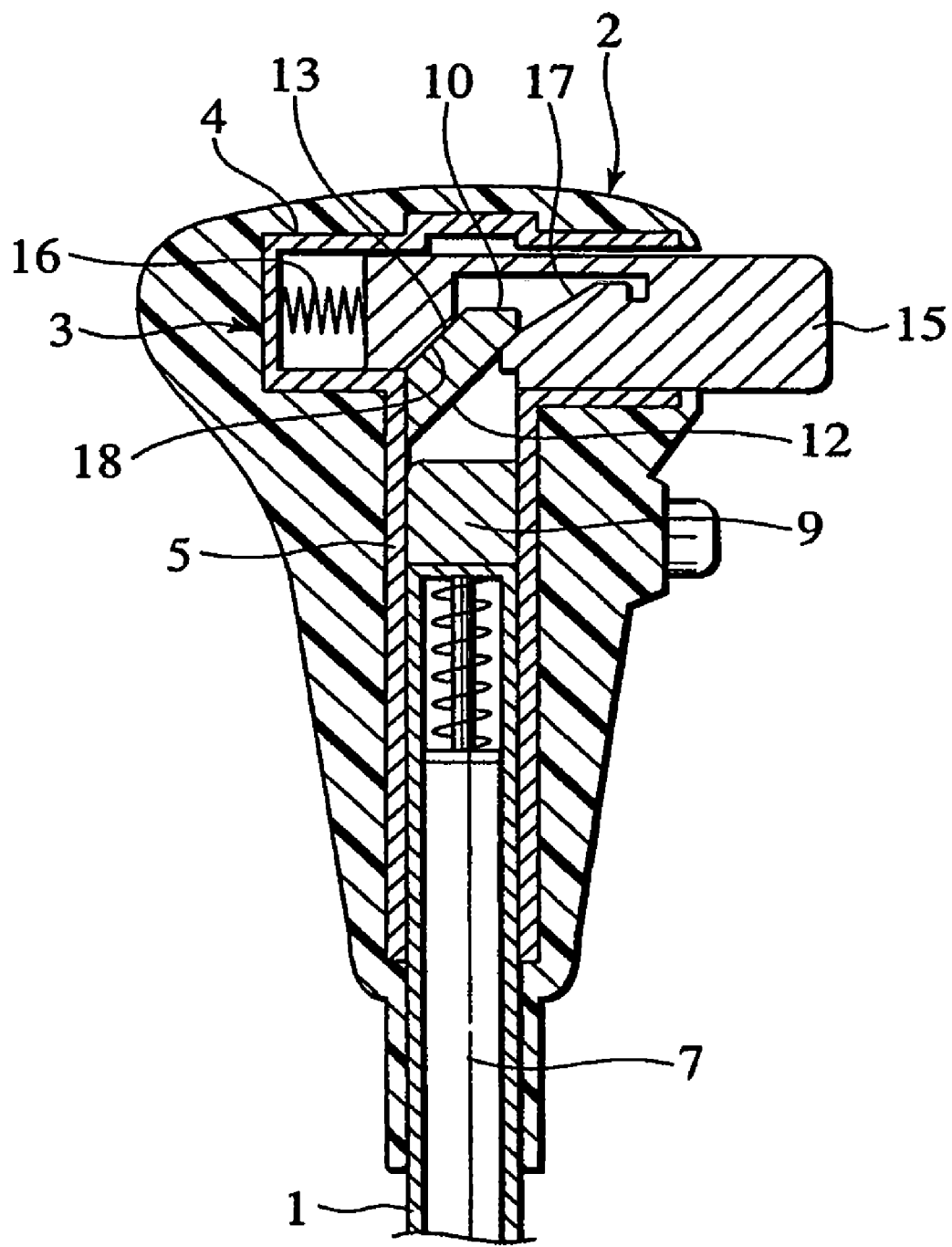
FIG. 17 is a longitudinal sectional view of a shift lever and a shift knob of the Related Art.
Figure 18:
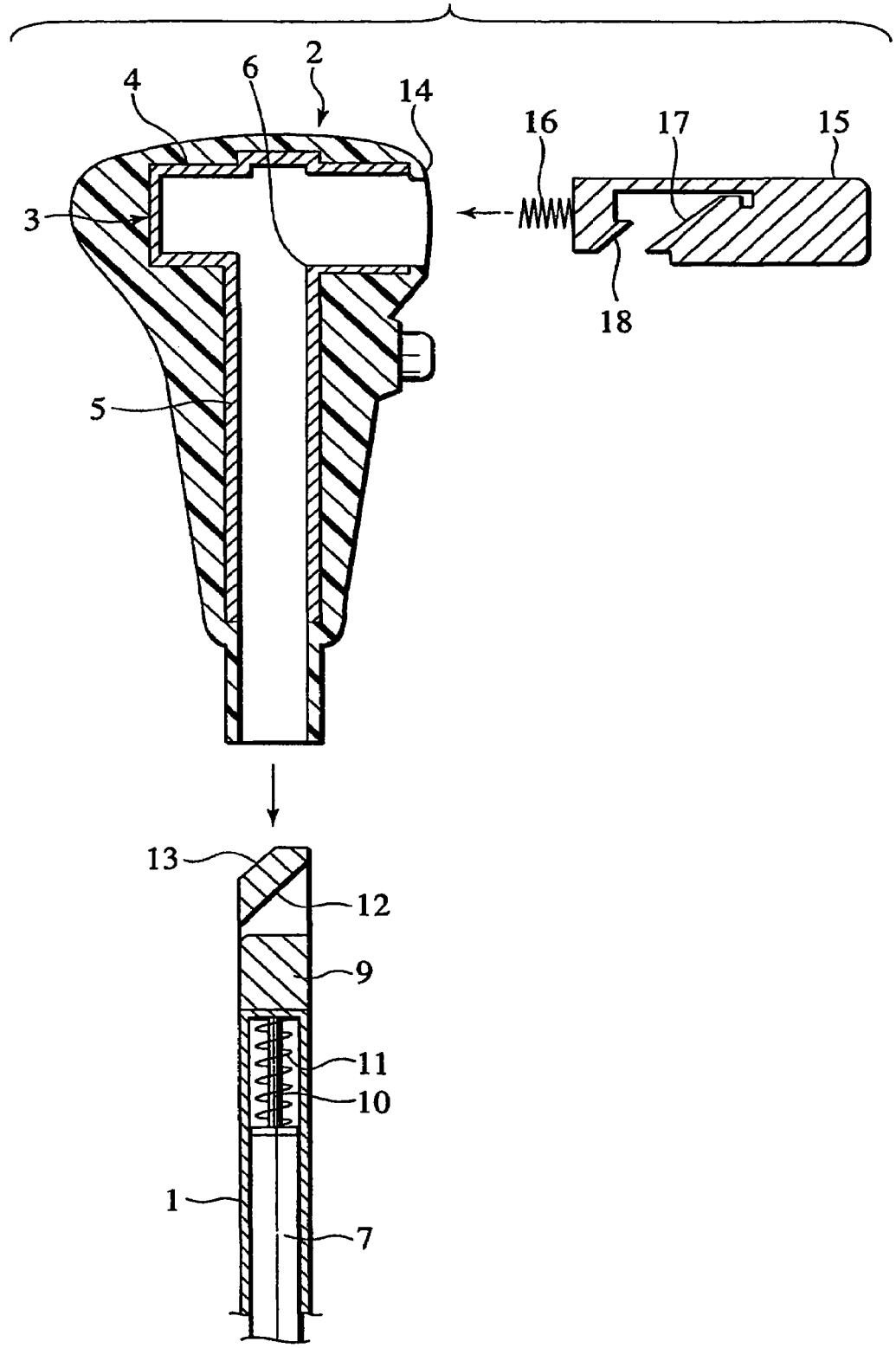
FIG. 18 is a longitudinal sectional view of the device in FIG. 17 before fitting.
Figure 19:
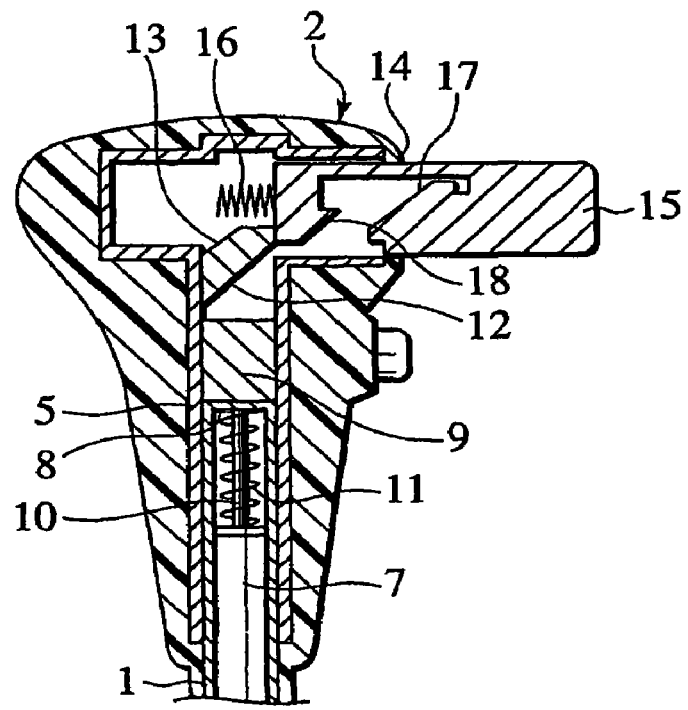
FIG. 19 is a longitudinal sectional view showing a fitting operation of the device in FIG. 17.
Figure 20:
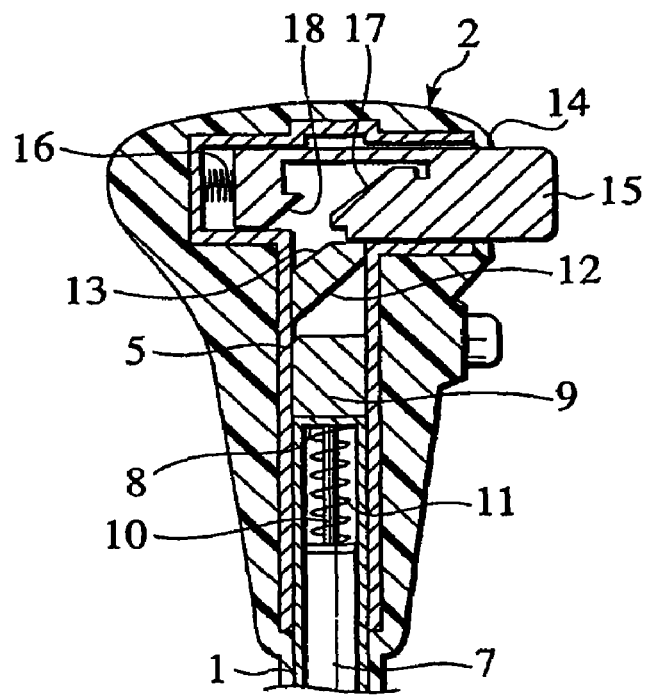
FIG. 20 is a longitudinal sectional view showing another fitting operation of the device in FIG. 17.

FIG. 15 shows a state in which an upper inner surface 54a of the engaging hole 54 of the pull block 39 is formed into a cylinder, the straight engaging portion 67 of the link lever 46 is inserted into the engaging hole 54 and the shift button 30 is yet to be pushed in.

This case causes a large gap 68 from a point to start pushing the shift button 30 to a point of contact of the straight engaging portion 67 of the turned link lever 46 with the upper inner surface 54a of the engaging hole 54. Accordingly, this case causes a large useless motion range from starting pushing the shift button 30 to pulling up the pull block 39.

As the link lever 46 is turned counterclockwise in the drawing when the shift button 30 is pushed in, the straight engaging portion 67 firstly comes into contact with a corner 54b on a link lever 46 side of the upper inner surface 54a of the engaging hole 54. Then, an upper surface 67a of the straight engaging portion 67 presses the entire upper inner surface 54a and finally presses a corner 54c located on an opposite side of the straight engaging portion 67.

That is to say, this embodiment is inferior to the first embodiment in terms of the following points: the contact position between the straight engaging portion 67 of the link lever 46 and the engaging hole 54 of the pull block 39 is shifted when the link lever 46 is turned; an operating direction 69 of the arcuate engaging portion 49 is different from an operating direction 70 of the pull block 39; and, as a result, a direction of action of the force received by the pull block 39 varies depending on the degree of the force to push the shift button 30, thus requiring a device for smoothly moving the pull block 39. Nevertheless, since the engaging hole 54 of the pull block 39 and the link lever 46 have simpler shapes than those in the first embodiment, it is possible to manufacture the shift lever 28 and the shift knob 29 at lower costs.

If the free end of the link lever 46 is formed into the arcuate engaging portion 49 as shown in FIG. 10 and the upper end of the engaging hole 54 is formed into the roundly shaped portion 55, it is possible to approximately align the operating direction of the link lever 46 with that of the pull block 39. In this way, it is possible to stabilize the operating force of the shift button 30.

In the embodiments of the present invention, a shift lever device includes:

a stationary member 33 fixed to a vehicle body 20;

a shift lever 28 turnably fitted at a base end thereof to the stationary member 33;

an engaging member 40 provided through the shift lever 28, which is movable relative to the shift lever 28, toward the base end of the shift lever 28 to engage with the stationary member 33 and toward a distal end of the shift lever 28 to disengage from the stationary member 33, the engaging member 40 having a first engaging part 39 on the side of the distal end of the shift lever 28; and a knob 29 to be fitted on the distal end of the shift lever 28, the knob 29 comprising a knob body 29a provided with a fitting hole 29b, 39a into which the distal end of the shift lever 28 is inserted together with the first engaging part 39 of the engaging member 40, a button 30 pivoted on the knob body 29a, to be operated for moving the engaging member 40, and a link lever 46 connected to the button 30, having a second engaging part 49 to be engaged with the first engaging part 39 of the engaging member 40, the link lever 46 movable between a first position where the second engaging part 49 is out of the fitting hole 29b and a second position where the second engaging part 49 crosses the fitting hole 29b, as the button 30 is operated, wherein the distal end of the shift lever 28 is inserted into the fitting hole 29b as the link lever 46 is in the first position, and, with the distal end of the shift lever 28 at a predetermined position in the fitting hole 29b, the button 30 is operated to move the link lever 46 from the first position to the second position and to have the second engaging part 49 engaged with the first engaging part 39.

According to this structure, if the button 30 is operated/pushed in when the knob 29 is located at the predetermined position relative to the shift lever 28, the link lever 46 can be engaged with the engaging member 40. Since an operation of fitting the knob 29 while pushing the shift button 30 becomes unnecessary, the knob 29 is readily fitted to the shift lever 28, improving efficiency of a fitting operation of the shift lever device.

Further, in the embodiments of the present invention, the shift lever device includes:

a detection mechanism configured to detect the predetermined position by changing insertion resistance of the distal end of the shift lever 28 to the fitting hole 29b of the knob body 29a.

According to this structure, when inserting the shift lever 28 into the fitting hole 29b of the knob 29, it is possible to detect that the link lever 46 has reached a position engageable with the engaging member 40 by means of changing the required insertion force at the point of reaching the predetermined position.

Still further, in the embodiments of the present invention, the detection mechanism includes:

an elastic member 59 provided on the knob body 29a, having a protrusion 60 protruding inward from the inner circumferential surface of the fitting hole 29b of the knob body 29a; and a guide groove 61 provided on an outer circumferential surface of the distal end of the shift lever 28, for guiding the protrusion 60 of the elastic member 59 as the distal end of the shift lever 28 is inserted into the fitting hole 29b of the knob body 29a, the guide groove 61 having a terminal end on the side of the base end of the shift lever 28, and wherein the insertion resistance is changed by the protrusion 60 of the elastic member 59 coming into contact with an end wall 62 at the terminal end of the guide groove 61.

According to this structure, the elastic member 59 comes into contact with the end wall 62 of the guide groove 61 when the knob 29 is pushed toward the base end of the shift lever 28. Accordingly, it is possible to detect that the shift knob 29 has reached the predetermined position. In other words, the operator can easily recognize the timing for starting pushing the button 30 and increasing the inserting force of the shift knob 29.

Still further, in the embodiments of the present invention, the shift lever 28 is formed to have, in a position below the guide groove 61 on the outer circumferential surface of the distal end thereof, a fixing hole 63 provided for engagement with the protrusion 60 of the elastic member 59, and the protrusion 60 overpasses a stepped portion 64 formed between the fixing hole 63 and the end wall 62 at the terminal end of the guide groove 61 and engages with the fixing hole 63, as the distal end of the shift lever 28 is inserted into the fitting hole 29b of the knob body 29a.

According to this structure, when the elastic member 59 overpasses the stepped portion 64 between the end wall 62 of the guide groove 61 and the fixing hole 63, the elastic member 59 is deformed and insertion resistance of the shift knob 29 is increased. Accordingly, the operator can surely recognize proper timing for pressing the shift button 30 while appropriately adjusting the insertion force of the shift knob 29.

Further, in the embodiments of the present invention, the link lever 46 is pivoted on the knob body 29a and the second engaging part 49 of the link lever 46 is formed in a concave toward a pivot of the link lever 46.

According to this structure, it is possible to make a shape of the link lever 46 in the turning direction smaller (or an anteroposterior direction in the case of a front button type). Accordingly, it is possible to make the link lever 46 compact.

Moreover, the link lever 46 can be inserted to the engaging hole 54 of the engaging member 40 in substantially parallel with an axial direction of the engaging hole 54. Accordingly, it is possible to reduce a gap between the link lever 46 and the engaging member 40 when operating the shift button 30.

Furthermore, it is possible to apply the pulling force of the link lever 46 consistently upward relative to the engaging member 40, or to stabilize the loading direction. Therefore, the load loss for pulling up the engaging member 40 is reduced and less force is required for operating the shift button 30.

Further, in the embodiments of the present invention, the first engaging part 39 of the engaging member 40 comprises an engaging hole 54, and the second engaging part 49 of the link lever 46 is inserted into the engaging hole 54 for engagement therebetween, and an upper periphery of the engaging hole 54 is formed in a rounded shape 55 in section.

According to this structure, the roundly shaped portion 55 guides the link lever 46 when the link lever 46 is inserted into the engaging hole 54 of the engaging member 40.

Moreover, it is possible to apply the pulling force of the link lever 46 acting onto the engaging member 40 consistently upward. Therefore, the load loss for pulling up the engaging member 40 is reduced and less force is required for operating the shift button 30.

Further, in the embodiments of the present invention, the first engaging part 39 of the engaging member 40 comprises an engaging hole 54, and the second engaging part 49 of the link lever 46 is inserted into the engaging hole 54 for engagement therebetween, and a lower periphery of the engaging hole 54 is formed to have a slope 56 on a side of the link lever 46.

According to this structure, the slope 56 guides the link lever 46 when the link lever 46 is inserted into the engaging hole 54 of the engaging member 40.

Further, in the embodiments of the present invention, a guide protrusion 66 is provided on any one of an outer circumferential surface of the distal end of the shift lever 28 and an inner circumferential surface of the fitting hole 29b of the knob body 29a, and a guide slit/groove 65 is provided for guiding the guide protrusion 66 on the other one of the outer circumferential surface of the distal end of the shift lever 28 and the inner circumferential surface of the fitting hole 29b of the knob body 29a.

According to this structure, the angular position of the shift knob 29 relative to the shift lever 28 can be regulated when the shift lever 28 is inserted into the shift knob 29. In this way, it is possible to place the link lever 46 of the shift knob 29 so as to face the engaging hole 54 of the engaging member 40 properly.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2003-165899, filed on Jun. 11, 2003, the disclosure of which is expressly incorporated herein by reference in its entirety.

What is claimed is:

1. A shift lever device comprising:
a stationary member fixed to a vehicle body;
a shift lever turnably fitted at a base end thereof to the stationary member;
an engaging member provided through the shift lever, which is movable relative to the shift lever, toward the base end of the shift lever to engage with the stationary member and toward a distal end of the shift lever to disengage from the stationary member, the engaging member having a first engaging part on the side of the distal end of the shift lever;

a knob to be fitted on the distal end of the shift lever, the knob comprising
    a knob body provided with a fitting hole into which the distal end of the shift lever is inserted together with the first engaging part of the engaging member, wherein the knob is attached to the shift lever with the distal end of the shift lever at an attachment position in the fitting hole,
    a button pivoted on the knob body, to be operated for moving the engaging member, and
    a link lever connected to the button, having a second engaging part to be engaged with the first engaging part of the engaging member, the link lever movable between a first position where the second engaging part is out of the fitting hole and a second position where the second engaging part crosses the fitting hole, as the button is operated,
wherein the distal end of the shift lever is inserted into the fitting hole as the link lever is in the first position, and, with the distal end of the shift lever at a predetermined position in the fitting hole other than the attachment position, the button is operated to move the link lever from the first position to the second position and to have the second engaging part engaged with the first engaging part; and
a detection mechanism configured to detect the predetermined position by changing insertion resistance of the distal end of the shift lever to the fitting hole of the knob body.

2. The shift lever device according to claim 1, wherein the detection mechanism comprises:
    an elastic member provided on the knob body, having a protrusion protruding inward from the inner circumferential surface of the fitting hole of the knob body; and
    a guide groove provided on an outer circumferential surface of the distal end of the shift lever, for guiding the protrusion of the elastic member as the distal end of the shift lever is inserted into the fitting hole of the knob body, the guide groove having a terminal end on the side of the base end of the shift lever, and
    wherein the insertion resistance is changed by the protrusion of the elastic member coming into contact with an end wall at the terminal end of the guide groove.

3. The shift lever device according to claim 2,
wherein the shift lever is formed to have, in a position below the guide groove on the outer circumferential surface of the distal end thereof a fixing hole provided for engagement with the protrusion of the elastic member, and
wherein the protrusion overpasses a stepped portion formed between the fixing hole and the end wall at the terminal end of the guide groove and engages with the fixing hole, as the distal end of the shift lever is inserted into the fitting hole of the knob body.

4. The shift lever device according to claim 1,
wherein the first engaging part of the engaging member comprises an engaging hole, and the second engaging part of the link lever is inserted into the engaging hole for engagement therebetween, and
wherein an upper periphery of the engaging hole is formed in a rounded shape in section.

5. The shift lever device according to claim 1,
wherein the first engaging part of the engaging member comprises an engaging hole, and the second engaging part of the link lever is inserted into the engaging hole for engagement therebetween, and
wherein a lower periphery of the engaging hole is formed to have a slope on a side of the link lever.

6. The shift lever device according to claim 1, wherein a guide protrusion is provided on any one of an outer circumferential surface of the distal end of the shift lever and an inner circumferential surface of the fitting hole of the knob body, and
    a guide slit/groove is provided for guiding the guide protrusion on the other one of the outer circumferential surface of the distal end of the shift lever and the inner circumferential surface of the fitting hole of the knob body.

7. A shift lever device comprising:
a stationary member fixed to a vehicle body;
a shift lever turnably fitted at a base end thereof to the stationary member;
an engaging member provided through the shift lever, which is movable relative to the shift lever, toward the base end of the shift lever to engage with the stationary member and toward a distal end of the shift lever to disengage from the stationary member, the engaging member having a first engaging part on the side of the distal end of the shift lever; and
a knob to be fitted on the distal end of the shift lever, the knob comprising
    a knob body provided with a fitting hole into which the distal end of the shift lever is inserted together with the first engaging part of the engaging member,
    a button pivoted on the knob body, to be operated for moving the engaging member, and
    a link lever pivoted on the knob body and connected to the button, having a second engaging part to be engaged with the first engaging part of the engaging member, the second engaging part being formed in a concave toward a pivot of the link lever, the link lever movable between a first position where the second engaging part is out of the fitting hole and a second position where the second engaging part crosses the fitting hole, as the button is operated,
wherein the distal end of the shift lever is inserted into the fitting hole as the link lever is the first position, and, with the distal end of the shift lever at a predetermined position in the fitting hole, the button is operated to move the link lever from the first position to the second position and to have the second engaging part engaged with the first engaging part.

* * * * *

UNITED STATES PATENT AND TRADEMARK OFFICE
CERTIFICATE OF CORRECTION

PATENT NO.         : 7,430,940 B2
APPLICATION NO.    : 10/864871
DATED              : October 7, 2008
INVENTOR(S)        : Yoshinobu Kondou et al.

It is certified that error appears in the above-identified patent and that said Letters Patent is hereby corrected as shown below:

On the title page,

In Item "(73) Assignee:", change "Kanagama Ken" to --Kanagawa-Ken--; and

After "Kanagama Ken (JP)", insert the second assignee --FUJI KIKO CO., LTD., Kosai-shi, Shizuoka-ken (JP)--.

Signed and Sealed this

Eighth Day of December, 2009

David J. Kappos
*Director of the United States Patent and Trademark Office*